US008121923B1

(12) United States Patent
Ruccolo

(10) Patent No.: US 8,121,923 B1
(45) Date of Patent: Feb. 21, 2012

(54) AUTOMATED FULFILLING OF CURRENCY EXCHANGE REQUESTS OVER A COMPUTER NETWORK

(76) Inventor: Michael A. Ruccolo, Juno Beach, FL (US)

( * ) Notice: Subject to any disclaimer, the term of this patent is extended or adjusted under 35 U.S.C. 154(b) by 0 days.

(21) Appl. No.: 13/045,156

(22) Filed: Mar. 10, 2011

Related U.S. Application Data

(60) Provisional application No. 61/422,357, filed on Dec. 13, 2010, provisional application No. 61/312,796, filed on Mar. 11, 2010.

(51) Int. Cl.
*G06Q 40/00* (2012.01)
(52) U.S. Cl. .............................. 705/35; 705/37; 705/40
(58) Field of Classification Search .................. 705/35, 705/37
See application file for complete search history.

(56) References Cited

U.S. PATENT DOCUMENTS

| | | | |
|---|---|---|---|
| 5,963,923 A * | 10/1999 | Garber | 705/37 |
| 6,892,184 B1 | 5/2005 | Komem et al. | |
| 7,194,481 B1 | 3/2007 | Van Roon | |
| 7,433,837 B2 | 10/2008 | Dawson | |
| 7,464,057 B2 | 12/2008 | Cole et al. | |
| 7,536,335 B1 | 5/2009 | Weston et al. | |
| 7,580,886 B1 | 8/2009 | Schulz | |
| 7,590,595 B2 | 9/2009 | Pessin | |
| 7,742,985 B1 | 6/2010 | Digrigoli et al. | |
| 7,747,475 B1 * | 6/2010 | Bowman et al. | 705/26.1 |
| 2002/0161692 A1 | 10/2002 | Loh et al. | |
| 2003/0097321 A1 | 5/2003 | Arikawa et al. | |
| 2004/0111356 A1 * | 6/2004 | Srivastava et al. | 705/37 |
| 2004/0236664 A1 | 11/2004 | Sellberg et al. | |
| 2005/0154674 A1 | 7/2005 | Nicholls et al. | |

(Continued)

FOREIGN PATENT DOCUMENTS

WO 0120508 A2 3/2001

(Continued)

OTHER PUBLICATIONS

"New for Traders," Anonymous, Futures (Jan. 2005), vol. 34, Iss. 1, p. 68.*

(Continued)

*Primary Examiner* — Elizabeth Rosen
(74) *Attorney, Agent, or Firm* — Panitch Schwarze Belisario & Nadel LLP

(57) ABSTRACT

An automated method is provided for fulfilling currency exchange requests received at a processor for a plurality of different currencies that are received from a plurality of different customers. The processor fulfills at least some of the requests by automatically matching requests of one or more customers with requests of one or more other customers who have requested an exchange of the converse target and source currencies in an amount of currency sufficient to match a first portion of the requests using the currency exchange rates in the memory of the processor, and using amounts of currency in different currency types that are not received from the customers to fulfill a second portion of the requests using the currency exchange rates in the memory of the processor. The fulfillment of the second portion is performed at the end of each of the predetermined time periods. The currency exchange requests are always guaranteed to be fulfilled at the same currency exchange rate that exists when the currency exchange requests are received at the processor.

20 Claims, 8 Drawing Sheets

Entity Relationships

U.S. PATENT DOCUMENTS

| | | | |
|---|---|---|---|
| 2005/0283422 A1 | 12/2005 | Myr | |
| 2006/0089899 A1* | 4/2006 | Durkin et al. | 705/37 |
| 2006/0173771 A1 | 8/2006 | Johnston | |
| 2006/0218071 A1* | 9/2006 | Sweeting | 705/37 |
| 2007/0005481 A1* | 1/2007 | Kedia et al. | 705/37 |
| 2007/0239576 A1* | 10/2007 | Hirani et al. | 705/35 |
| 2008/0010186 A1* | 1/2008 | Weimer et al. | 705/37 |
| 2009/0037324 A1 | 2/2009 | McLaughlin et al. | |
| 2009/0248574 A1 | 10/2009 | Leung et al. | |
| 2010/0057607 A1* | 3/2010 | Galit | 705/37 |
| 2010/0306096 A1 | 12/2010 | Gorman | |

FOREIGN PATENT DOCUMENTS

| | | |
|---|---|---|
| WO | 2009093053 A1 | 7/2009 |

OTHER PUBLICATIONS

Foreign exchange market, Wikipedia, Printout from: http://en.wikipedia.org/wiki/Foreign_exchange_market, page last modified Mar. 8, 2010, 13 pages.

Pendle House—How It Works, Printout from: http://www.pendlehouse.com/LiveDemo.aspx, printout date: Jan. 27, 2011, 1 page.

Pendle House—Benefits, Printout from: http://www.pendlehouse.com/Benefits.aspx, printout date: Jan. 27, 2011, 1 page.

What is Multilateral Netting? by EuroNetting, Inc., Copyright 2005 EuroNetting, Inc., 3 pages.

* cited by examiner

Entity Relationships

Transaction Process Flow

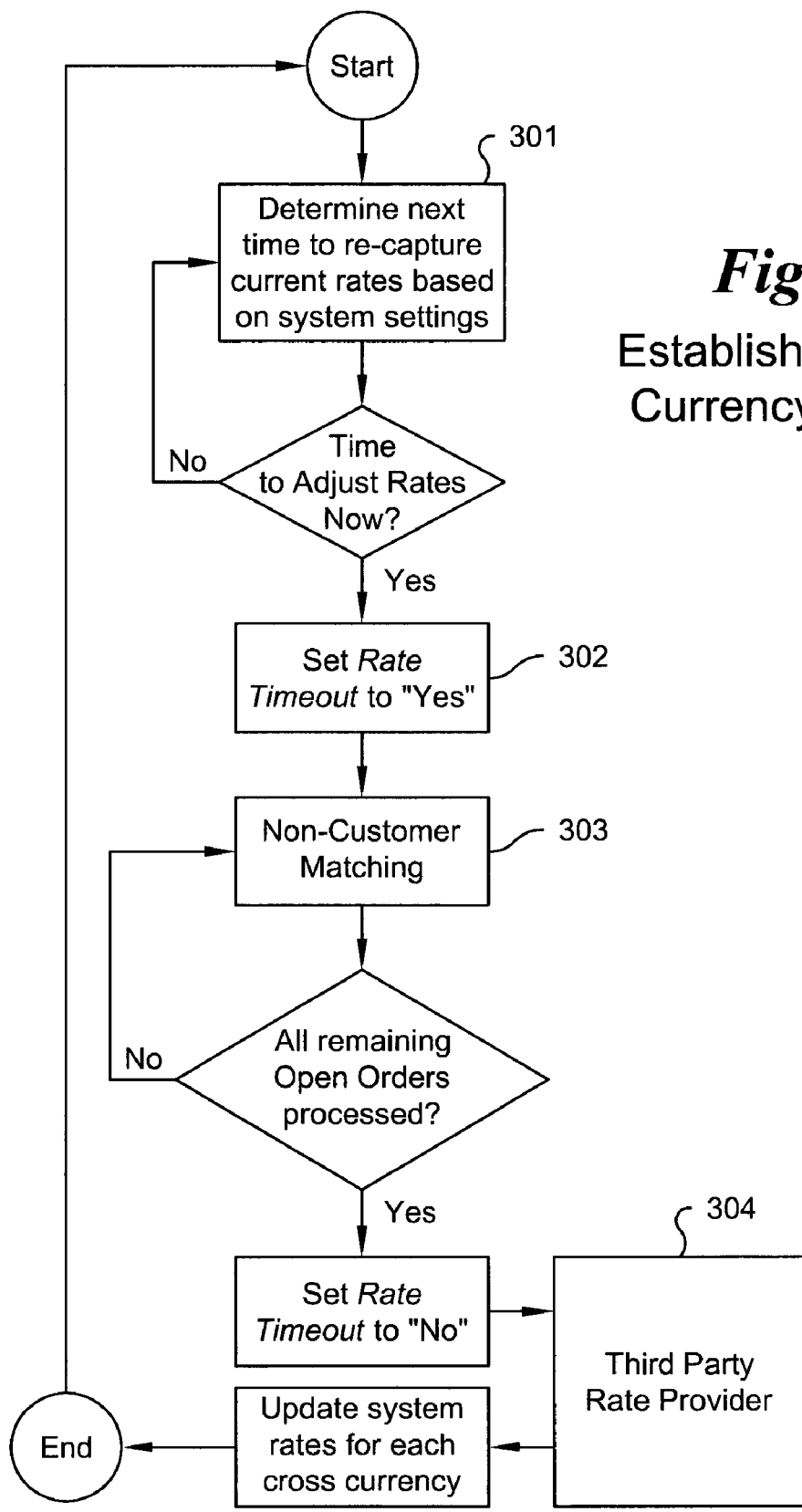

Customer Registration Process

Application Architecture

Comparison of Prior Art
to Present System

Customer Relationship Diagram

AUTOMATED FULFILLING OF CURRENCY EXCHANGE REQUESTS OVER A COMPUTER NETWORK

CROSS-REFERENCE TO RELATED APPLICATIONS

This application claims priority to U.S. Provisional Patent Application No. 61/312,796 filed Mar. 11, 2010 and U.S. Provisional Patent Application No. 61/422,357 filed Dec. 13, 2010, both of which are incorporated herein by reference.

BACKGROUND OF THE INVENTION

The foreign exchange market is a worldwide decentralized over-the-counter financial market for the trading of currencies. It is also referred to as "forex," "FX," or "currency market." The purpose of the foreign exchange market is to assist international trade and investment by allowing businesses to convert one currency to another foreign currency. For example, it allows a U.S. business to import European goods and pay Euros, even though the income of the business is in U.S. dollars. A typical foreign exchange transaction involves a party purchasing a quantity of one currency by paying a quantity of another currency.

According to the U.S. Census Bureau figures for U.S. International Trade in Goods and Services, in 2009 the U.S. export market transacted over $1 Trillion worth of goods and services and the U.S. import market transacted over $1.5 Trillion. Foreign exchange transactions are required to facilitate this import/export market.

Entities who need to perform an individual foreign exchange transaction typically pay significant fees, as discussed in more detail below. The present invention provides a system that dramatically reduces the fees associated with such foreign exchange transactions.

BRIEF SUMMARY OF THE INVENTION

An automated method is provided for fulfilling currency exchange requests received at a processor for a plurality of different currencies that are received from a plurality of different customers. Each request is a request to exchange an amount of funds of a source currency for funds of a target currency, or a request to receive an amount of funds of a target currency by exchanging source currency. The automated method is performed via the processor. A currency exchange rate for the plurality of different currencies that may be exchanged is provided in the memory of the processor. The processor receives the currency exchange requests from a plurality of different customers.

In one preferred embodiment, at least some of the requests are fulfilled by automatically matching requests of customers with requests of one or more other customers who have requested an exchange of the converse target and source currencies in an amount of currency sufficient to match a first portion of the requests using the currency exchange rate for the target and source currencies in the memory of the processor, and using amounts of currency in different currency types that are not received from the customers to fulfill a second portion of the requests.

In another preferred embodiment, at least some of the requests are fulfilled by automatically matching requests of customers with requests of one or more other customers who have requested an exchange of the converse target and source currencies in an amount of currency sufficient to match the requests of the customers using the currency exchange rate for the target and source currencies in the memory of the processor, and using amounts of currency in different currency types that are not received from the customers to fulfill requests of customers if no match can be made.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. However, the invention is not limited to the precise arrangements and instrumentalities shown.

In the drawings:

FIG. 3 is a detailed diagram illustrating the flow process of capturing currency conversion rates in accordance with preferred embodiments of the present invention.

DETAILED DESCRIPTION OF THE INVENTION

Certain terminology is used herein for convenience only and is not to be taken as a limitation on the present invention.

The present invention is described in the context of a web portal referred to as "World Currency" which connects to its customers via an electronic network, such as the Internet. However, the scope of the present invention is not limited to operating via a web portal or any specific type of electronic network. World Currency is also interchangeably referred to herein as "the system," "the Company" (COMP), and "WC." The computer elements of World Currency are interchangeably referred to as a "processor" and "Core Engine (504)."

Figure 7:
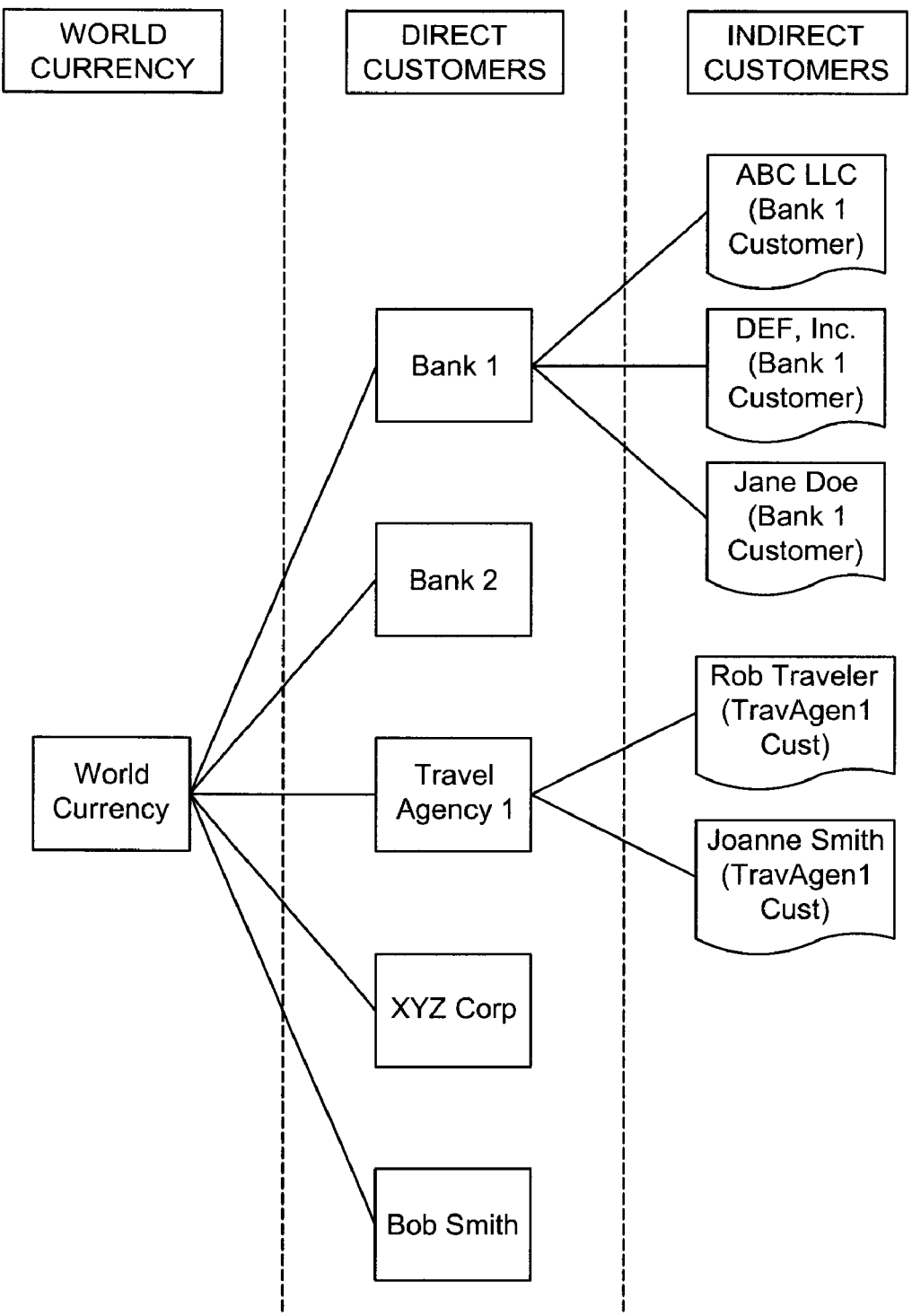
FIG. 7 illustrates the relationships between various entities in preferred embodiments of the present invention.

FIG. 7 shows the relationship between World Currency and its direct and indirect customers. Direct customers of World Currency may be banks, travel agencies, companies and individuals. Indirect customers of World Currency may be customers of the banks and customers of the travel agencies.

Figure 6:
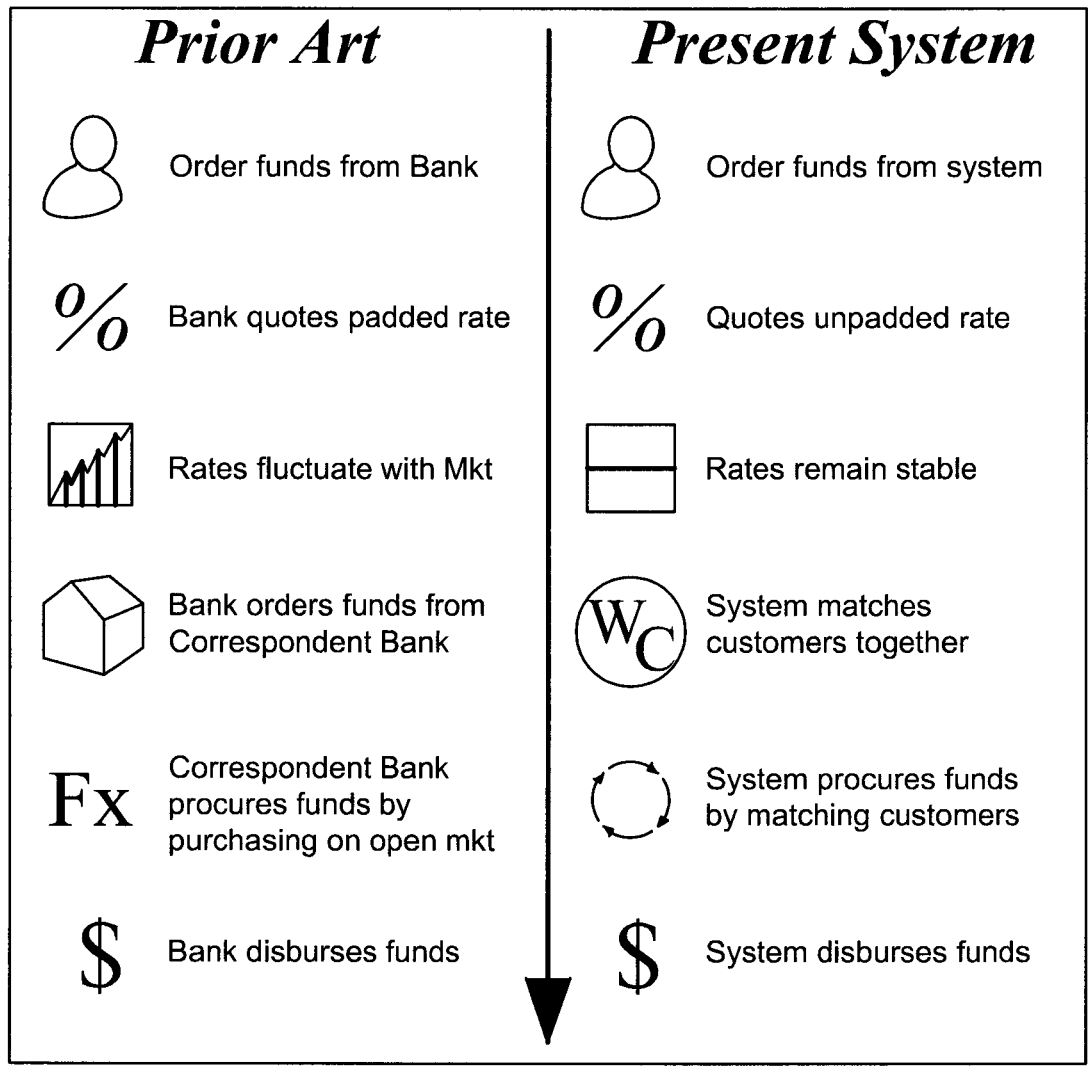
FIG. 6 is a general comparison of one preferred embodiment of the present invention versus the most conventional prior art process presently in use.

FIG. 6 is a general comparison of a preferred embodiment of the present invention matched against the most conventional prior art process presently in use. The following example is a scenario of a customer, here, an Importer/Exporter, that is based in the United States (with a U.S. Dollar (USD) bank account) and needs to purchase goods and services from a supplier in Canada. Payment is required in Canadian Dollars (CAD). In both cases the assumption has been made that the customer has a pre-existing direct relationship with the Bank and/or the present system.

The most conventional prior art process presently in use in the context of this example operates as follows:

1. The customer (USD importer/exporter) places a wire transfer at their bank for the amount of CAD that they are looking to send to their wholesaler in Canada, paying in CAD. As part of the wire process, the customer provides the bank with the appropriate wiring instructions.

2. The bank quotes a rate to the customer and the customer agrees to the rate. This rate is generally padded with a 3-6% spread over the spot or interbank rate to compensate for transaction costs and market fluctuation risks. In addition, the customer is generally also assessed a wire fee, often around $35 USD.

3. Exchange rates continue to fluctuate with time.

4. The bank places an order for the currency with a Correspondent Bank that they have an account relationship with. The Correspondent Bank quotes the bank with a different rate (market has fluctuated) which is also padded over the interbank or spot rate.

5. The Correspondent Bank ultimately procures funds by aggregating and placing large orders for CAD on the open market.

6. Once procured, the bank electronically transfers the CAD funds to the account designated by the importer/exporter on their wiring instructions.

One preferred embodiment of the present invention operates as follows:

1. The customer (USD importer/exporter) places an order within the World Currency web portal for the amount of CAD that they are looking to send to their wholesaler in Canada, paying in CAD. As part of the order, the customer provides World Currency with the appropriate wiring instructions. (Referring to FIG. 7, the customer (Importer/Exporter) would be an indirect customer of World Currency via its bank, which is a direct customer of World Currency. In an alternative process, the Importer/Exporter could be a direct customer of World Currency in a manner similar to XYZ Corp shown in FIG. 7.)

2. World Currency quotes a rate to the customer and the customer agrees to the rate. This base rate is unpadded and reflects the true value of the spot or interbank rate. However, the actual rate quoted to the customer may be padded to include the WC transaction fee embedded in the form of a spread.

3. Exchange rates remain constant for the duration of the open order.

4. World Currency attempts to match the customer's CAD amount with other World Currency customers seeking the offsetting amounts of USD.

5. World Currency procures currency by establishing the match and executing a currency swap between the customer and the other World Currency customer(s).

6. Once cleared, World Currency electronically transfers the CAD funds to the account designated by the customer on their wiring instructions.

Stated simply, World Currency attempts to automatically match a currency exchange request of a particular customer with requests of one or more other customers who have requested an exchange of the converse (opposite) target and source currencies. For example, a currency exchange request to receive Euros for dollars is automatically attempted to be matched with a converse request from one or more customers who wish to receive dollars for Euros. This process is shown in more detail in FIGS. 2A-2B which is described below.

Figure 1:
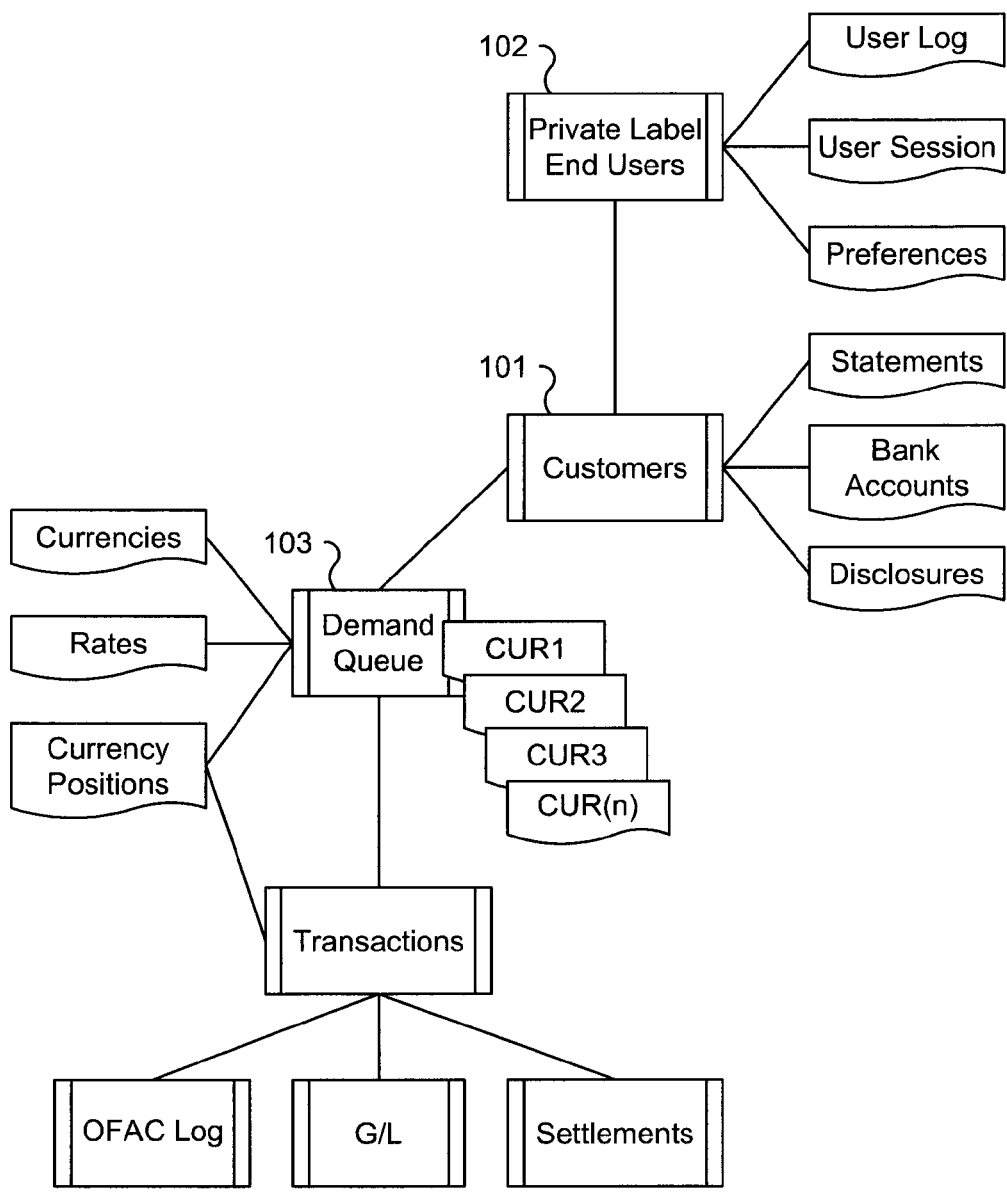
FIG. 1 is a schematic illustration of the major entities represented within the present invention and their relationships with respect to each other in accordance with one preferred embodiment of the present invention.

FIG. 1 is a diagram illustrating the general relationship between relevant entities. In the preferred embodiment, there are three major entities that interrelate to comprise the overall system, namely, Customers (101), Private Label End Users (102), and Demand Queue (103). The Customers (101) entity is a collection of businesses or individuals that maintain a direct relationship with the Company (i.e., the direct customers in FIG. 7). The Private Label End Users (102) entity is a collection of businesses or individuals that maintain an indirect relationship, in that these entities are clients of the Customers (101) that the respective Customers have authorized to use the system (i.e., the indirect customers in FIG. 7). The Demand Queue (103) entity is the representation of all open currency orders placed within the system by Customers (101) and Private Label End Users (102) for each specific cross currency.

Elements of FIG. 1, other than the following transaction elements and those that are self-explanatory, are discussed below with respect to the remaining figures:

OFAC Log: OFAC is The Office of Foreign Assets Control, which is an agency of the United States Department of the Treasury. The OFAC Log is a record of all currency exchange transactions that have been matched against the OFAC list of unauthorized entities.

G/L: General Ledger

Settlements: account reconciliation of the currency exchange transactions.

Figure 2A:
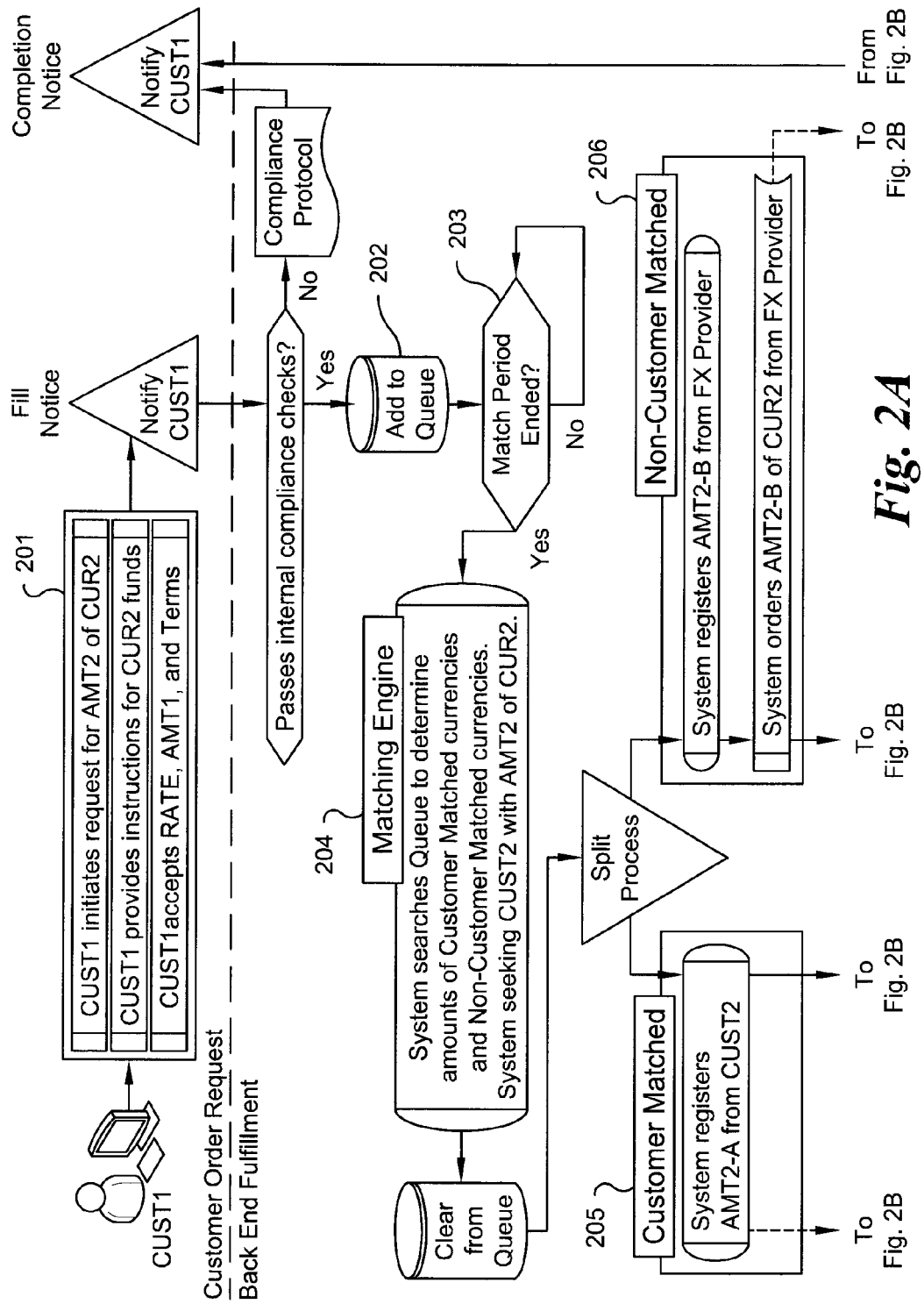
FIGS. 2A-2B, taken together, is a detailed diagram illustrating the flow process of an authorized customer executing a transaction in accordance with one preferred embodiment of the present invention.
Figure 2B:
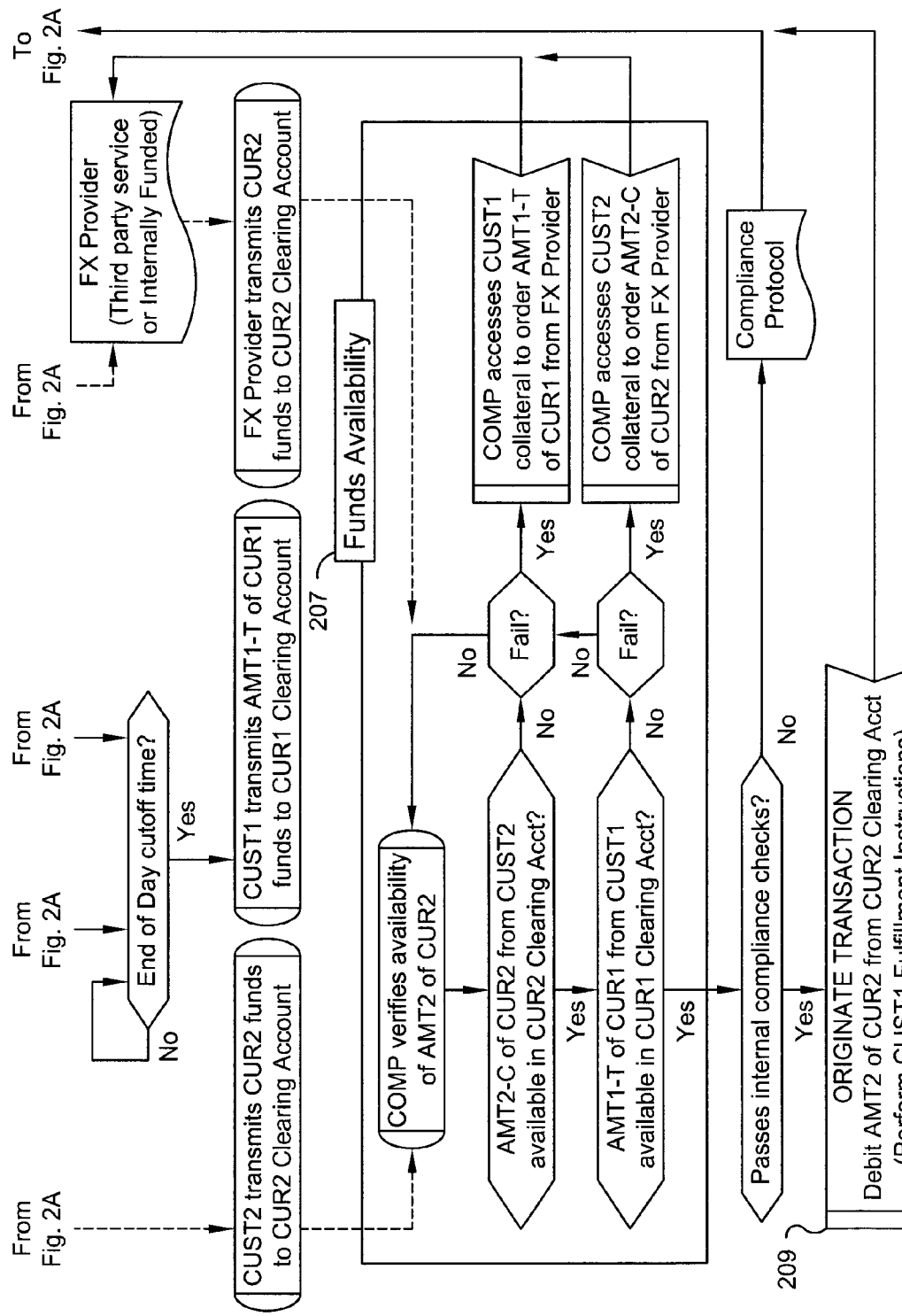

FIGS. 2A-2B, taken together, is a detailed diagram illustrating the flow process of an authorized customer executing a transaction within the processor. For the purposes of this diagram, the following terms are used:

a. COMP is the company using the present invention to facilitate this foreign currency transfer transaction. (Fulfillment is the transfer of funds.)

b. CUST1 is an authorized customer or an authorized customer's own client or a plurality of an authorized customer's own clients of COMP responsible for placing the request within the processor for a foreign currency transfer.

c. RATE is the currency conversion rate offered to the customer for a particular currency pair, as resident in the memory of the processor at the moment CUST1 submits the order. RATE is held fixed for the customer throughout the duration of the Match Period. The Match Period is the period of time, as defined by COMP, in which the published customer rate (RATE) is held constant and is independent of the current market currency conversion rate as reflected by live market conditions. RATE is adjusted up or down to synchronize with the current market currency conversion rate at the beginning of each Match Period. The current market currency conversion rate is fed to the processor via electronic connection from a rate source provider having a pre-established relationship with COMP.

d. CUR1 is the source currency of CUST1.

e. CUR2 is the target currency of CUST1.

f. AMT2 is the target amount of CUR2, the amount requested by CUST1.

g. AMT1 is the source amount of CUR1, the amount required by CUST1 to purchase AMT2 of CUR2.

h. CUST2 is a separate individual authorized customer, or set of multiple authorized customers, with concurrent open foreign currency transfer orders within the processor queue where the source currency of CUST2 is CUR2, the target currency of CUST2 is CUR1, and the aggregate source amount of CUST2 is equal or greater to AMT2 of CUR2.

i. FEE1 is the transaction fee imposed on CUST1 by the processor in the form of a percentage of AMT1. As defined by COMP and held resident in the memory of the processor, FEE1 may either be represented to the customer as a separate fee amount to be added to AMT1 or may be singularly represented in the form of a spread embedded within the RATE presented to the customer. In either option FEE1 will represent the same total cost to the customer.

j. FEE2 is the transaction fee imposed on CUST2 by the processor in the form of a percentage of AMT2. As with FEE1, FEE2 may either be represented as a separate fee amount or in the form of a spread embedded in RATE.

k. Customer Matched refers to all orders, or portions of orders, that are fulfilled by using funds from more than one customer (CUST1 and CUST2) by matching offsetting currency pairs between the customers. The funds supplied by the one order will be used to fulfill the request of the other order, and vice versa. Every order may have Customer Matched and Non-Customer Matched portions.

l. Non-Customer Matched refers to all orders, or portions of orders, that are fulfilled by using funds from a single customer (CUST1) to procure the designated amount of target currency. COMP will use existing relationships to fulfill Non-Customer Matched portions which may include third-party procurement services from an established FX provider, internally funding amounts, or other methods to ensure that every customer request is successfully fulfilled. Every order may have Customer Matched and Non-Customer Matched portions.

m. End of Day refers to the moment in time, as defined by COMP, in which the processor stops opening customer orders on the current business day and begins to register orders on the next business day.

n. AMT2-A is the Customer Matched portion of AMT2 as determined by the Matching Engine (204).

o. AMT2-B is the Non-Customer Matched portion of AMT2 as determined by the Matching Engine (204).

p. AMT2-C is the outstanding portion of AMT2 remaining to procure to satisfy a customer order in the event of a failure to receive funds from CUST1 and/or CUST2.

q. AMT1-T is the total sum of AMT1 funds drawn from CUR1 due from CUST1 for all orders requested within the same single business day. CUST1 may place several currency requests throughout a given business day, AMT1-T represents the total amount of CUR1 due to COMP from CUST1 to satisfy payment for orders on a given business day.

Referring to FIGS. 2A-2B, CUST1 initiates the transaction flow process by entering the transaction within the Order Entry System (201) in which CUST1 provides the processor with the defined values of AMT2 and CUR2, either by directly specifying the desired amount of CUR2 or alternatively specifying an amount of CUR1 and allowing the system to calculate the amount of CUR2 based on the RATE. CUST1 further provides instructions on how the system will handle the exact fulfillment of this order which include, but are not limited to, delivering the AMT2 funds of CUR2 to a specified bank account via electronic funds transfer or delivering the AMT2 funds of CUR2 to a bank card issued to CUST1 designed to be accessible by debit card and/or credit card networks. To finish the order process, CUST1 accepts the RATE, AMT1, FEE1, and all current terms and conditions disclosed at the point of submission. When the order process as referenced in step (201) is finished, the currency exchange request is completely concluded from the customer's perspective (i.e., the CUST1 order will be fulfilled and delivered) and the currency exchange request now undergoes backend fulfillment described in steps (202) through (209). Upon completion of backend fulfillment, the target currency is transferred to its final destination based on the instructions presented by CUST1 at the time of original order placement. This process is somewhat analogous to a standard bank wire transfer wherein the customer authorizes and approves the wire transfer upon the placement of the request of order instruction and then there is a period of time before the designated payment arrives and clears at the target destination. Here, COMP determines the time frame necessary to procure and deliver the CUST1 funds to the target currency and the CUST1 order will be processed and fulfilled within that established time frame for the original designated rate, amount, and fee established at the time of the CUST1 request. The CUST1 order will be fulfilled regardless of market rate fluctuation, method of backend fulfillment (i.e., customer matched and/or non-customer matched), or the existence of other customer orders within the system.

Once the order has been submitted by CUST1 to the processor, a fill notice is provided to CUST1 to verify the filling of the order request by COMP, the transaction is placed in an "open status" and the order immediately enters into the backend fulfillment process. After the completion of the appropriate industry standard compliance checks, a representation of this order is added to a Queue (202) of current open demand for a designated source currency pegged against a designated target currency (the current demand of CUR1 versus CUR2). The Queue continually keeps track of the current outstanding portion of AMT2 required to complete the CUST1 transaction for the current Match Period and keeps results resident in the memory of the processor to facilitate the proper determination of Customer Matched and Non-Customer Matched portions of the order request.

Orders are continually being requested and queued by the processor throughout the duration of the Match Period (203) based on current customer demand. The end of the Match Period is determined by the processor and may be triggered by the earliest of the following events:

(1) Upon the expiration system parameter, as defined by COMP, specifying the maximum time limit for a continuous Match Period;

(2) Upon the automatic triggering of ending the Match Period by the processor based on exceeding certain thresholds or tolerance levels as defined by COMP; or (3) Upon the manual triggering of ending the Match Period by COMP staff.

At the close of each Match Period, a Matching Engine (204) is invoked by the processor to iterate through the Queue to first search for a condition where the system can match some or all AMT2 of the CUST1 order with AMT1 of a CUST2 order. The processor identifies the aggregate balance due within each currency pair as the Customer Matched amount and the remaining portion becomes the Non-Customer Matched amount.

Customer Matched procedures (205) are followed for each currency pair on the portion of the order requests placed throughout the duration of the Match Period determined by the processor as Customer Matched by the Matching Engine process (204). The processor registers the appropriate amount of AMT2 required from the CUST2 orders necessary to satisfy the Customer Matched portion of the order (AMT2-A).

Non-Customer Matched procedures (206) are followed for each currency pair on the portion of the order requests placed throughout the duration of the Match Period determined by the processor as Non-Customer Matched by the Matching Engine process (204). The processor registers the appropriate amount of AMT2 required to satisfy the Non-Customer Matched portion of the order (AMT2-B). The processor automatically places a foreign exchange order for the required funds with an FX Provider. The FX Provider will be either (1) an external third-party provider of foreign exchange services in which COMP will have a pre-established relationship (e.g., with a prime broker) or (2) an internal source of funds (e.g., retained earnings), as defined by COMP and held resident in the memory of the processor.

At the conclusion of each business day, as determined by COMP through the setting of the End of Day cutoff time, each party that holds a balance with COMP (CUST1, CUST2, and/or FX Provider) will have until the end of the next business day to transmit their balances to the COMP Clearing Account. This begins the Funds Availability (207) process in which COMP verifies and settles all balances before fulfilling the customer orders. All incoming order requests placed within the system after the End of Day cutoff time are booked as transactions recorded on the following business day.

As previously mentioned, at the end of the current business day of the order request, CUST1 is required to electronically transmit AMT1-T of CUR1 to the COMP Clearing Account for the source currency. This electronic transmission is external to the computer system and is not initiated by COMP. This transaction will satisfy the balance due from CUST1 for the entire business day's allotment of currency requests.

In the exact same manner that CUST1 is required to electronically transmit balances to COMP, all other customers with currency requests for the current business day are required to electronically transmit balances to COMP. Those amounts from these other customers in which the system processor has identified as Customer Matched portions of the CUST1 by the Matching Engine process (204) are expected to satisfy the balance due from CUST2 to account for the Customer Matched portion of the currency request. This electronic transmission is external to the computer system and is not initiated by COMP.

Those amounts identified by the system processor during the Matching Engine process (204) and in which the system has ordered funds from FX Provider as described in the Non-Customer Matched procedures (206) are required to be electronically transmitted to the COMP Clearing Account to satisfy the remaining balance needed to complete the fulfillment of CUR2 funds for CUST1. This electronic transmission is external to the computer system and is not initiated by COMP.

In the event of a failure by CUST2 in which COMP determines the inability of CUST2 to supply the necessary AMT2-C amount of CUR2 to properly fund the CUST1 order request within the necessary timeframe (if there are portions of Customer Matched funds required), COMP will draw on the pre-established collateral account in effect for CUST2 and COMP will use those funds to place an order with the FX Provider for the outstanding balance of CUR2 required to fulfill the CUST1 order request. This step in the process guarantees that the CUST1 order request will be successfully fulfilled even in the event of a failure by CUST2. Similarly, in the event of a failure by CUST1 to supply the necessary AMT1-T amount of CUR1, COMP will draw on the pre-established collateral account in effect for CUST1.

Once the funds are procured and credited to the COMP CUR2 clearing account and available for use, and after the completion of appropriate industry standard compliance checks, the processor proceeds to originate a debit (209) for the AMT2 of CUR2 funds from the COMP CUR2 clearing account and follow the fulfillment instructions set forth by CUST1 as defined at the point of Order Entry (201). The transaction is finally placed in a "closed status" and a final notice of transaction completion is sent to CUST1.

The transaction flow in FIGS. 2A-2B guarantees that the CUST1 order request will always be successfully fulfilled at the rate quoted to the customer by the processor at order submission (RATE). (This rate is the rate provided in the memory of the processor.) The guarantee exists whether or not a matching customer (e.g., CUST2) enters an order during the MATCH PERIOD. The guarantee also exists if a matching customer enters an order during the MATCH PERIOD and then fails to supply the necessary amount of currency or fails to pass the internal compliance checks. Of course, if CUST1 fails to pass the internal compliance checks and/or fails to successfully transmit AMT1-T of CUR1 to the COMP Clearing Account for the source currency, the CUST1 fulfillment guarantee would not be honored.

In the transaction flow of FIGS. 2A-2B, the CUST1 order request will always be successfully fulfilled within a predetermined amount of time after order submission unless CUST1 fails to pass the internal compliance checks and/or fails to successfully transmit AMT1-T of CUR1 to the COMP Clearing Account for the source currency. The fulfillment time will not be affected by the lack of an exchange request of the converse target and source currencies. Since the MATCH PERIOD is a period of time defined by the company that periodically ends, and since all currency exchange requests are processed at the end of each MATCH PERIOD, and since backend fulfillment is performed within a known time period (e.g., 2 business days), then the CUST1 order request will always be successfully fulfilled within a predetermined amount of time after order submission.

FIG. 3 is a detailed diagram illustrating the flow process of the establishment of currency conversion rates to be held in the memory of the processor. The system continually runs this process to properly determine the correct moment in which a new currency conversion rate will be set for each cross currency offered by the processor. First, the system will determine the next time to re-capture rates based on current system settings (301). These system settings may include, but are not limited to, the establishment of predefined time intervals and/or the use of thresholds or tolerance levels to determine whether to adjust the rate for a particular cross currency pair.

When the processor is triggered to change the currency conversion rate, the system starts by setting the Rate Timeout to "Yes", (302) and as further referenced in FIG. 2A (203) designating the end of the Match Period. This allows for all remaining open customer orders to follow the Non-Customer Matched procedures, (303) and as further referenced in FIG. 2A (206). Once all orders have been processed, the Rate Timeout is reset to "No" and the processor uses a third party rate provider (304) to obtain current conversion rates used to update system rates for each cross currency.

Figure 4:
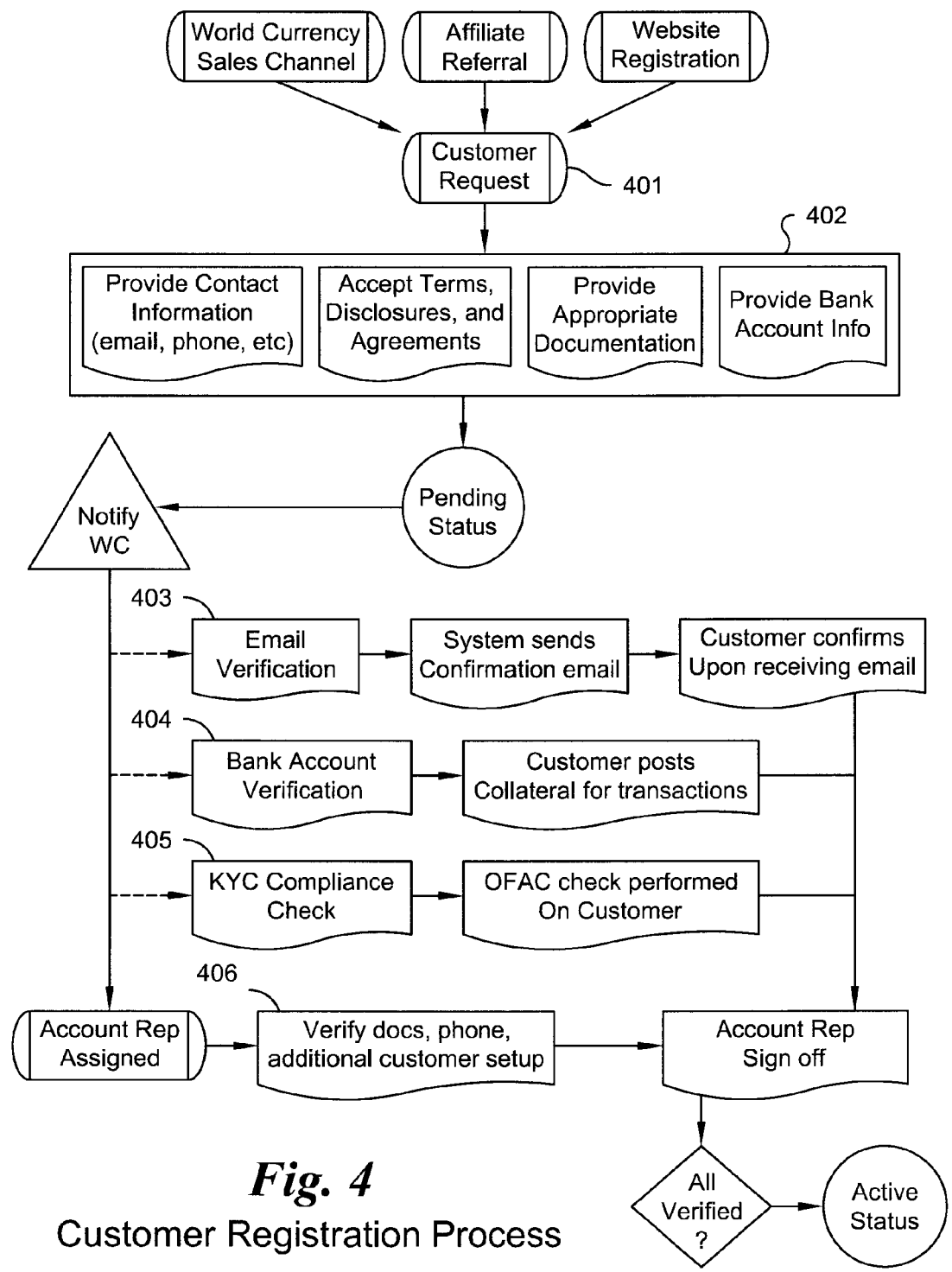
FIG. 4 is a detailed diagram illustrating the flow process of adding an verifying a new customer in accordance with one preferred embodiment of the present invention.

FIG. 4 is a detailed diagram illustrating the flow process of how a business entity or individual will register to become an authorized customer within the present system. The business entity or individual will ultimately request (401) to register with the system. At this point, several pieces of information must be collected (402) for verification. Contact information, such as name, email address, phone number, and other standard data will be collected. The terms and conditions, as well as any agreements or disclosures must be accepted. In the case of a business entity, additional corporate documents or other materials may be required. The details of an existing bank account must be provided, which will be used as the customer bank account that the processor will debit funds from to purchase the target currencies. Once all information is entered and the customer request has been submitted the customer account is placed in a "pending status." Several independent verification steps now occur. The email address provided may require verification (403) by industry standard methods. The bank account information provided may require verification (404) by industry standard methods and a collateral line will be established which will be used to secure against the risks of the customer failing to make good on timely payments for currency orders. The exact vehicle and amount of collateral will be determined by COMP and will be used to calculate the imposed transaction volume limits. Industry standard Know Your Customer (KYC) compliance checks (405) may be required. Verification of documents and/or other information (406) may be required.

Upon successful verification of all outstanding items, both by the processor and internal staff, the customer account is placed in an "active status" and the customer is authorized to use the system.

Figure 5:
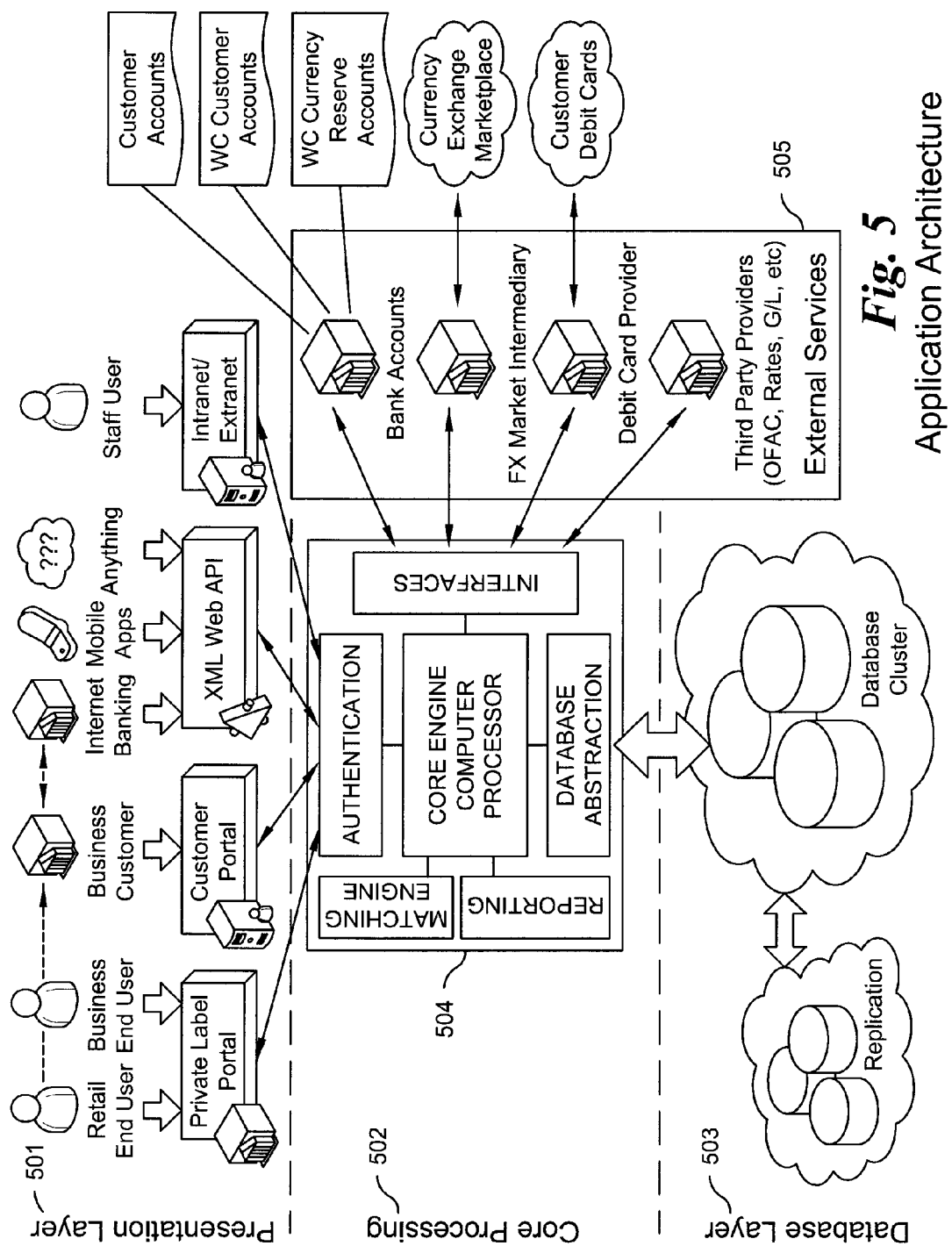
FIG. 5 is a schematic illustration of the application architecture in accordance with one preferred embodiment of the present invention.

FIG. 5 illustrates one preferred embodiment of the overall application architecture of the present system. The system in FIG. 5 is has a multi-tiered design, comprised of three major layers, Presentation (501), Core Processing (502), and Database (503). Each tier is designed so that it may exist autonomously from the other tiers and may reside on a separate single server, cluster of servers, or multiple physical or virtual servers.

The Presentation Layer (501) houses all of the front-end customer and staff facing web systems and services used by the present invention to deliver content to the end users based on the selected and authorized medium. Currency exchange requests are submitted via the Presentation Layer (501) to Core Engine (504), along with all other information that must be received by the customer to facilitate the currency exchange request.

The Core Processing Layer (502) is where the central server system resides in the form of the Core Engine (504). This processor represents all of the systems and code used to execute the core functionality of the present invention. Back-end External services (505) interact with the Core Engine (504) in order to feed data back and forth between external systems and third party vendors. The matching engine discussed above is part of the Core Engine (504).

The Core Engine (504) also provides authentication of the inputs received from the Presentation Layer (501). The core engine also provides database abstraction, such as a database abstraction layer which is an application programming interface (API) that unifies the communication between a computer application and databases (here, the Database Cluster of the Database Layer 503).

The Database Layer (503) maintains the database storage engines and the necessary replication of data to offsite secured locations.

Using the processes and machine hardware described above, various embodiments of the present invention may be implemented. Customer currency exchange requests are fulfilled by matching the requests with a combination of other customer currency exchange requests and non-customer currency. Non-customer currency may be obtained from any combination of sources other than a customer currency exchange request, such as a currency exchange marketplace and/or a currency reserve (i.e., amounts of currency maintained in the World Currency processor), both shown in FIG. 5. In FIG. 5, the currency exchange marketplace is referred to as "Third-Party Procurement" and the currency reserve is referred to as "Internally Funded." Once a match is made, the amounts of currency associated with the match become unavailable for subsequent matches.

One preferred embodiment of the present invention provides an automated method of fulfilling a currency exchange request received at a processor from a particular customer. The processor receives currency exchange requests for a plurality of different currencies from a plurality of different customers. Each request is either a request to exchange an amount of funds of a source currency (CUR1) for funds of a target currency (CUR2), or a request to receive an amount of funds of a target currency (CUR2) by exchanging source currency (CUR1). The automated method is performed via the processor. The method operates as follows:

1. A currency exchange rate for the plurality of different currencies that may be exchanged is provided in a memory of the processor, represented in the "Rates" entity shown in FIG. 1.

2. The currency exchange request from the particular customer is received at the processor and is fulfilled in the following manner:

a. The request of the particular customer is automatically matched with requests of one or more other customers who have requested an exchange of the converse target and source currencies using the currency exchange rate for the target and source currencies in the memory of the processor.

b. If no match can be made in step a, then use amounts of currency in different currency types that are not received from the customers to fulfill the request of the particular customer.

Consider the example of currency exchange requests between euros and dollars. If, during a particular time period, more customers are requesting to receive euros in exchange for dollars than there are customers requesting to receive dollars in exchange for euros (in total amounts of currency), then there will be some customers for which no match can be made during the time period. Those customers will have their requests fulfilled with non-customer amounts of currency.

The match in step a may be a partial match of the amount of the currency exchange request. If a partial match can be made, then a first portion of the request is fulfilled in step a, and a second portion of the request is fulfilled in step b. The second portion is preferably the remaining portion of the request. This process is illustrated in FIGS. 2A-2B.

In one alternative process of this embodiment, the match in step a must be a match of the entire amount of the currency exchange request (i.e., a complete match). Otherwise, the request is fulfilled using non-customer currency. In this alternative process, the partial match decision box shown in FIG. 2A would be ignored. The use of partial matches is preferred since it promotes efficiency of the system and reduces the amount of non-customer currency required to fulfill requests. However, there may be instances where it may be desirable for the system not to fulfill requests with partial matches.

Another preferred embodiment of the present invention provides an automated method of fulfilling a currency exchange request received at a processor from a particular customer. The processor receives currency exchange requests for a plurality of different currencies from a plurality of different customers. Each request is either a request to exchange an amount of funds of a source currency for funds of a target currency, or a request to receive an amount of funds of a target currency by exchanging source currency. The automated method is performed via the processor. The method operates as follows:

1. A currency exchange rate for the plurality of different currencies that may be exchanged is provided in a memory of the processor.

2. The currency exchange request from the particular customer is received at the processor and is fulfilled by a combination of the following methods:

a. Automatically match the request of the particular customer with requests of one or more other customers who have requested an exchange of the converse target and source currencies in an amount of currency sufficient to match a first portion of the request of the particular customer using the currency exchange rate for the target and source currencies in the memory of the processor.

b. Use amounts of currency in different currency types that are not received from the customers to fulfill a second portion of the request of the particular customer.

This embodiment covers any situation wherein first and second portions are fulfilled from a combination of customer and non-customer currency. Thus, it is similar to the previously described embodiment when partial matching occurs, since a first portion of the request will be fulfilled with amounts of currency from one or more other customers, and a second portion of the request will be fulfilled with non-customer currency. However, it also covers embodiments wherein non-customer currency is used, even when customer currency is still available for matching (i.e., there is still unmatched customer currency associated with an exchange of the converse target and source currencies). In this embodiment, the partial match decision box shown in FIG. 2 may reflect either (i) an actual partial match wherein there is a shortfall that prevents a complete match, or (ii) a partial match that is forced by the system even though a complete match could be made. Again, it is preferred to use customer currency when it is available because it promotes efficiency of the system and reduces the amount of non-customer currency required to fulfill requests. However, there may be instances where it may be desirable for the system to deliberately use some non-customer currency to fulfill a request, even when customer currency is available to fulfill the entire request. Again, the second portion is preferably the remaining portion of the request.

Yet another preferred embodiment of the present invention provides an automated method of fulfilling currency exchange requests received at a processor for a plurality of different currencies that are received from a plurality of different customers. Each request is either a request to exchange an amount of funds of a source currency for funds of a target currency, or a request to receive an amount of funds of a target currency by exchanging source currency. The automated method is performed via the processor. The method operates as follows:

1. A currency exchange rate for the plurality of different currencies that may be exchanged is provided in a memory of the processor.
2. The processor receives currency exchange requests from a plurality of different customers.
3. At least some of the requests are fulfilled using the processor by a combination of the following methods:

a. Automatically match requests of one or more customers with requests of one or more other customers who have requested an exchange of the converse target and source currencies in an amount of currency sufficient to match a first portion of the requests using the currency exchange rate for the target and source currencies in the memory of the processor.

b. Use amounts of currency in different currency types that are not received from the customers to fulfill a second portion of the requests.

This embodiment is similar to the previously described embodiment, except that it describes a process from the perspective of servicing a plurality of different customers. In the preferred embodiment of the present invention, a plurality of different customers simultaneously enter currency exchange requests. As discussed above, the currency exchange requests in the queue are cleared at the end of each predetermined time period, which preferably coincides with the time period wherein the currency exchange rate is updated.

Additional features of the present invention are described in more detail below.

1. Debit card: Funds of target currency for at least one of the fulfilled currency exchange requests may be loaded onto a debit card for subsequent use by the customer who requested the currency exchange. Referring to FIG. 5, a Debit Card Provider receives account data from World Currency customer accounts (which contain the target currency resulting from the customer's currency exchange request) and creates customer debit cards therefrom. In this embodiment, the fulfillment instructions referred to in FIGS. 2A-2B include a request for a debit card loaded with the target currency amount.

2. Timing of automatic matching: FIGS. 2A-2B show a process wherein match requests are automatically fulfilled upon receipt, and in order of receipt, and then cleared from the queue at the end of a predetermined time period, which is preferably when the currency exchange rates are updated. However, in an alternative embodiment, the match requests may be batched during each predetermined time period and then fulfilled either periodically during the predetermined time period, or immediately before the next currency exchange rate update using a predefined fulfillment order algorithm.

3. Fulfillment using non-customer amounts of currency: When non-customer amounts of currency are used to fulfill all or part of a particular currency request, the step of obtaining the non-customer amounts of currency may be performed at the end of a predetermined time period, such as when the currency exchange rates are updated, which occurs periodically, as shown in FIGS. 2A-2B and 3. Alternatively, the step of obtaining the non-customer amounts of currency may be performed either immediately after the matching step fails (if no partial matching occurs), or immediately after partial matching occurs. However, the embodiment shown in FIGS. 2A-2B and 3 is preferred because it allows for more complete matching, thereby reducing the amount of currency that needs to be fulfilled from non-customer entities. Stated simply, a partial currency match may be able to be completely matched, or more fully partially matched but not completely matched, as more requests are received during the predetermined time period.

4. Currency exchange rate: The currency exchange rate for each of the plurality of different currencies is preferably preset by the processor. The currency exchange rate for the plurality of currencies may be fixed during the predetermined time period. Alternatively, the currency exchange rate for the plurality of currencies may have a predetermined spread during the predetermined time period, and the currency exchange rate for each customer is the rate that exists when a request is received by the processor from a customer.

In one alternative embodiment, the currency exchange rate may be tolerance-based and time-based in that it may change upon the current market rate dropping below or exceeding a tolerance, or threshold level, above or below the set rate in effect, all of which would not exceed a predetermined time period. For example, if the predetermined time period is set to 6 hours, and the threshold for USD to EUR is 1%, then the rate would also re-capture within the 6 hour period (and potentially several times) if the current market rate rises or falls in excess of 1% of the current USD/EUR rate captured within the system, but the rate will change at least every 6 hours guaranteed even if the threshold is not met.

In the preferred embodiment of the present invention, the currency exchange rate adjustment process is transparent to the customer. Thus, the customer's expectations of the system would not be affected by the particular combination of tolerance vs. time-based rate adjustments employed by the system.

5. Customers: Referring to FIG. 7, if the customer is a single individual or business, then the customer is a single customer entity. However, if the customer is a financial institution acting on behalf of a plurality of individuals and/or businesses, then the customer may actually be or represent a plurality of customer entities. In one preferred embodiment, the plurality of different customers are unaffiliated with each other. If some of the customers are financial institutions, this means that the financial institutions are unaffiliated with each other. For example, they would not be different offices or branches of the same financial institution (e.g., German branch of Deutsche Bank and U.S. branch of Deutsche Bank). However, the scope of the present invention includes embodiments wherein the different customers may be affiliated with each other.

6. Customer notification of fulfillment methodology: The customers are preferably not informed as to whether their particular currency exchange requests were fulfilled entirely from, or partially from, other customer requests or from non-customer entities. However, to promote community affiliation, which may be advantageous from a marketing standpoint, the customers may be informed of the total or their individual breakdowns in currency fulfillment. For example, the following types of messages may be delivered to the customers: 100% of your currency exchange request was fulfilled by an exchange with one or more other customers; 80% of all currency exchange requests in the system on the date of the customer's request were fulfilled by exchanges with other customers.

The processor discussed above may be any general-purpose computer, such as a personal computer (PC) that runs a Microsoft Windows® operating system or a mainframe computer running a UNIX-type operating system.

The present invention may be implemented with any combination of hardware and software. If implemented as a computer-implemented apparatus, the present invention is implemented using means for performing all of the steps and functions described above.

When implemented in software, the software code can be executed on any suitable processor or collection of processors, whether provided in a single computer or distributed among multiple computers.

The present invention can also be included in an article of manufacture (e.g., one or more computer program products) having, for instance, computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer used herein may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

The computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. An automated method of fulfilling currency exchange requests received at a processor for a plurality of different currencies that are received from a plurality of different customers, each request being (i) a request to exchange an amount of funds of a source currency for funds of a target currency, or (ii) a request to receive an amount of funds of a target currency by exchanging source currency, the automated method being performed via the processor, the method comprising:
  (a) providing in a memory of the processor a currency exchange rate for the plurality of different currencies that may be exchanged;
  (b) updating the currency exchange rates in the memory at the end of each of a succession of predetermined time periods;
  (c) receiving at the processor currency exchange requests from a plurality of different customers to be filled at the exchange rates in the memory; and
  (d) fulfilling, using the processor, at least some of the requests by:
    (i) automatically matching requests of one or more customers with requests of one or more other customers who have requested an exchange of the converse target and source currencies in an amount of currency sufficient to match a first portion of the requests using the currency exchange rates in the memory of the processor, and
    (ii) using amounts of currency in different currency types that are not received from the customers to fulfill a second portion of the requests using the currency exchange rates in the memory of the processor,
    wherein step (d)(ii) is performed at the end of each of the predetermined time periods, and
    wherein the currency exchange requests are always guaranteed to be fulfilled, and are actually fulfilled, at the same currency exchange rate that exists in the memory of the processor when the currency exchange requests are received at the processor, and thereby during each predetermined time period, all customers who make the same currency pair request to (i) exchange an amount of funds of a source currency for funds of a target currency, or (ii) receive an amount of funds of a target currency by exchanging source currency, receive the same currency exchange rate.

2. The method of claim 1 wherein step (b) occurs automatically.

3. The method of claim 1 further comprising:
  (e) adjusting the currency exchange rate for a currency during one of the predetermined time periods if the current market currency exchange rate exceeds the currency exchange rate set at the beginning of the predetermined time period by a predefined percentage or amount, the currency exchange rates being fixed during each of the time periods if the current market currency exchange rate does not exceed the currency exchange rate set at the beginning of the predetermined time period by a predefined percentage or amount,
    wherein requests received at the processor prior to a currency exchange rate adjustment are still fulfilled at the same currency exchange rate that exists when the currency exchange requests are received at the processor.

4. The method of claim 1 wherein step (d)(ii) is used to fulfill the remaining portion of the requests that is not fulfilled by the matching.

5. The method of claim 1 wherein the one or more customers or the one or more other customers is a plurality of customer entities.

6. The method of claim 1 wherein the one or more customers or the one or more other customers is a single customer entity.

7. The method of claim 1 wherein the plurality of different customers are unaffiliated with each other.

8. The method of claim 1 wherein the second portion of the requests is fulfilled by obtaining currency from a currency exchange marketplace.

9. The method of claim 1 wherein the second portion of the requests is fulfilled by using amounts of currency in different currency types that are maintained in the processor and which are associated with a currency reserve account.

10. The method of claim 1 wherein the second portion of the requests is fulfilled by (i) obtaining currency from a currency exchange marketplace, and (ii) using amounts of currency in different currency types that are maintained in the processor and which are associated with a currency reserve account.

11. The method of claim 1 wherein the customer is an individual or a business, the method further comprising:
  (e) loading the funds of target currency for at least one of the fulfilled currency exchange requests onto a debit card for subsequent use by the customer who requested the currency exchange.

12. The method of claim 1 wherein the currency exchange rate is quoted to the customers when the currency exchange requests are received at the processor so that the customers know the exchange rate that they are guaranteed to receive before proceeding with a request.

13. The method of claim 1 wherein step (d) is always performed within a guaranteed time period.

14. An automated method of fulfilling a currency exchange request received at a processor from a particular customer, the processor receiving currency exchange requests for a plurality of different currencies from a plurality of different customers, each request being (i) a request to exchange an amount of funds of a source currency for funds of a target currency, or (ii) a request to receive an amount of funds of a target currency by exchanging source currency, the automated method being performed via the processor, the method comprising:
  (a) providing in a memory of the processor a currency exchange rate for the plurality of different currencies that may be exchanged;
  (b) updating the currency exchange rates in the memory at the end of each of a succession of predetermined time periods;
  (c) receiving at the processor the currency exchange request from the particular customer; and
  (d) fulfilling, using the processor, the currency exchange request received at the processor from the particular customer by:
    (i) automatically matching the request of the particular customer with requests of one or more other customers who have requested an exchange of the converse target and source currencies in an amount of currency sufficient to match a first portion of the request of the particular customer using the currency exchange rates in the memory of the processor, and
    (ii) using amounts of currency in different currency types that are not received from the customers to fulfill a second portion of the request of the particular customer using the currency exchange rates in the memory of the processor, wherein step (d)(ii) is performed at the end of each of the predetermined time periods, and wherein the currency exchange request is always guaranteed to be fulfilled, and is actually fulfilled, at the same currency exchange rate that exists in the memory of the processor when the currency exchange request is received at the processor, and thereby during each predetermined time period, all customers who make the same currency pair request to (i) exchange an amount of funds of a source currency for funds of a target currency, or (ii) receive an amount of funds of a target currency by exchanging source currency, receive the same currency exchange rate.

15. The method of claim 14 wherein the currency exchange rate is quoted to the customer when the currency exchange request is received at the processor so that the customer knows the exchange rate that they are guaranteed to receive before proceeding with a request.

16. The method of claim 14 wherein the second portion of the request is fulfilled by one or both of the following methods:
   (i) obtaining currency from a currency exchange marketplace, and
   (ii) using amounts of currency in different currency types that are maintained in the processor and which are associated with a currency reserve account.

17. An automated method of fulfilling a currency exchange request received at a processor from a particular customer, the processor receiving currency exchange requests for a plurality of different currencies from a plurality of different customers, each request being (i) a request to exchange an amount of funds of a source currency for funds of a target currency, or (ii) a request to receive an amount of funds of a target currency by exchanging source currency, the automated method being performed via the processor, the method comprising:
   (a) providing in a memory of the processor a currency exchange rate for the plurality of different currencies that may be exchanged;
   (b) updating the currency exchange rates in the memory at the end of each of a succession of predetermined time periods;
   (c) receiving at the processor the currency exchange request from the particular customer to be filled at an exchange rate in the memory; and
   (d) fulfilling, using the processor, the currency exchange request received at the processor from the particular customer by:
      (i) automatically matching the request of the particular customer with requests of one or more other customers who have requested an exchange of the converse target and source currencies using the currency exchange rates in the memory of the processor, and
      (ii) determining that no match can be made in step (d)(i) and then using amounts of currency in different currency types that are not received from the customers to fulfill the request of the particular customer when no match can be made in step (d)(i) using the currency exchange rates in the memory of the processor,
   wherein step (d)(ii) is performed at the end of each of the predetermined time periods, and
   wherein the currency exchange request is always guaranteed to be fulfilled, and is actually fulfilled, at the same currency exchange rate that exists in the memory of the processor when the currency exchange request is received at the processor, and thereby during each predetermined time period, all customers who make the same currency pair request to (i) exchange an amount of funds of a source currency for funds of a target currency, or (ii) receive an amount of funds of a target currency by exchanging source currency, receive the same currency exchange rate.

18. The method of claim 17 wherein the currency exchange rate is quoted to the customer when the currency exchange request is received at the processor so that the customer knows the exchange rate that they are guaranteed to receive before proceeding with a request.

19. The method of claim 17 wherein the second portion of the request is fulfilled by one or both of the following methods:
   (i) obtaining currency from a currency exchange marketplace, and
   (ii) using amounts of currency in different currency types that are maintained in the processor and which are associated with a currency reserve account.

20. The method of claim 17 wherein step (d) is always performed within a guaranteed time period.

\* \* \* \* \*